Figure 1:
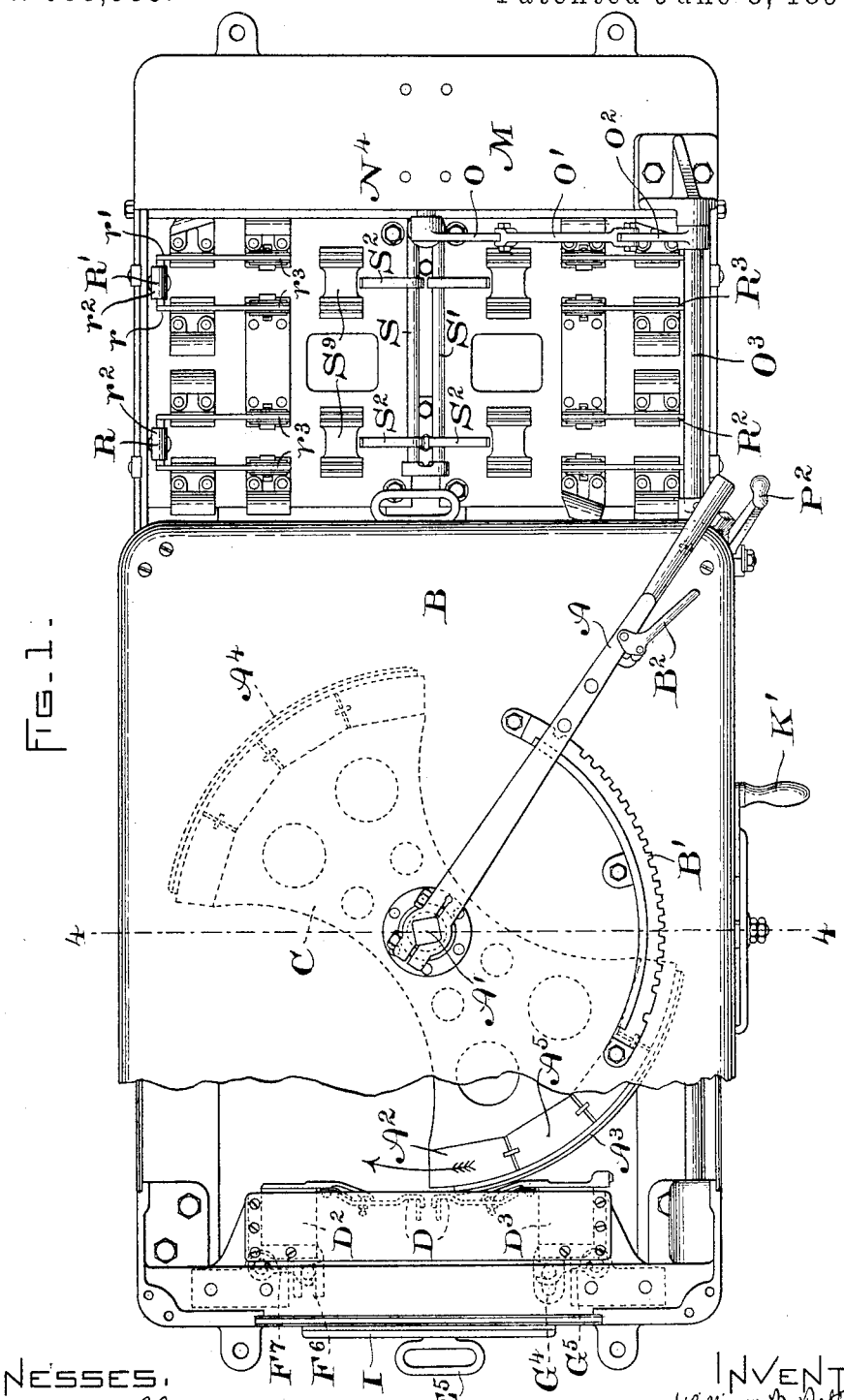

(No Model.) 8 Sheets—Sheet 1.

W. B. POTTER & F. E. CASE.
SERIES PARALLEL CONTROLLER.

No. 583,935. Patented June 8, 1897.

WITNESSES:
A. H. Abell.
A. F. Macdonald.

INVENTORS
William B. Potter and
Frank E. Case, by
Geo. R. Blodgett,
Att'y.

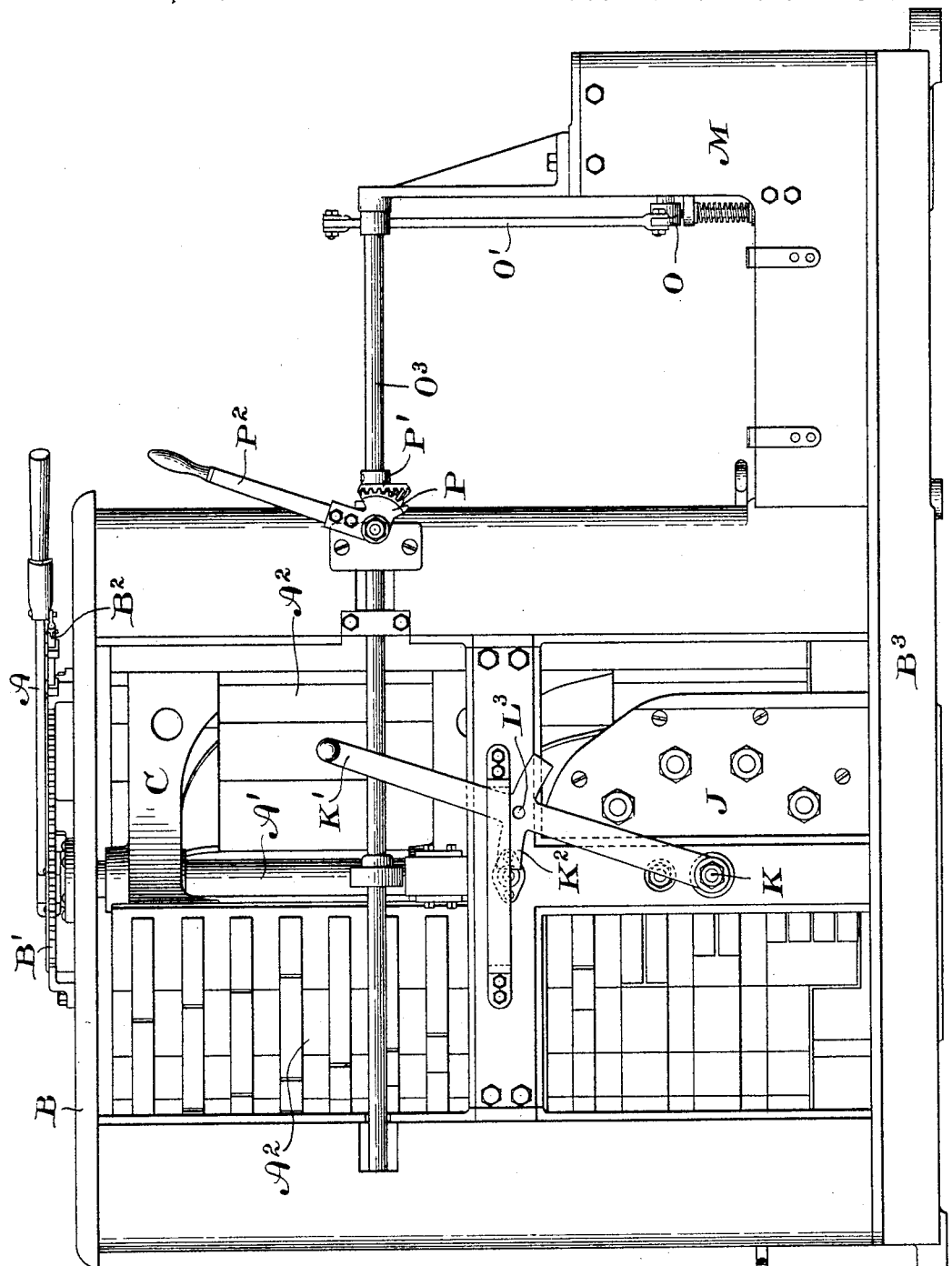

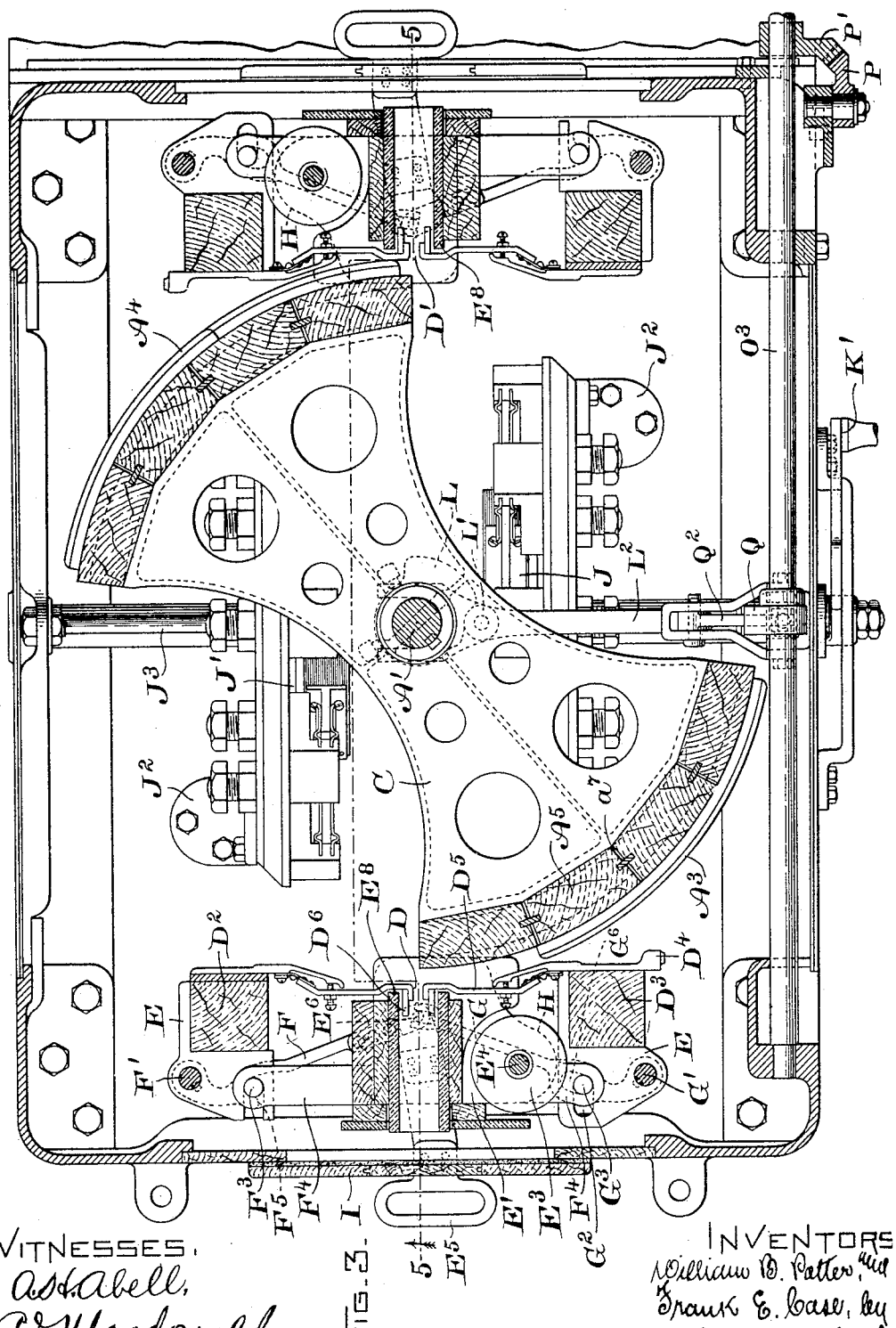

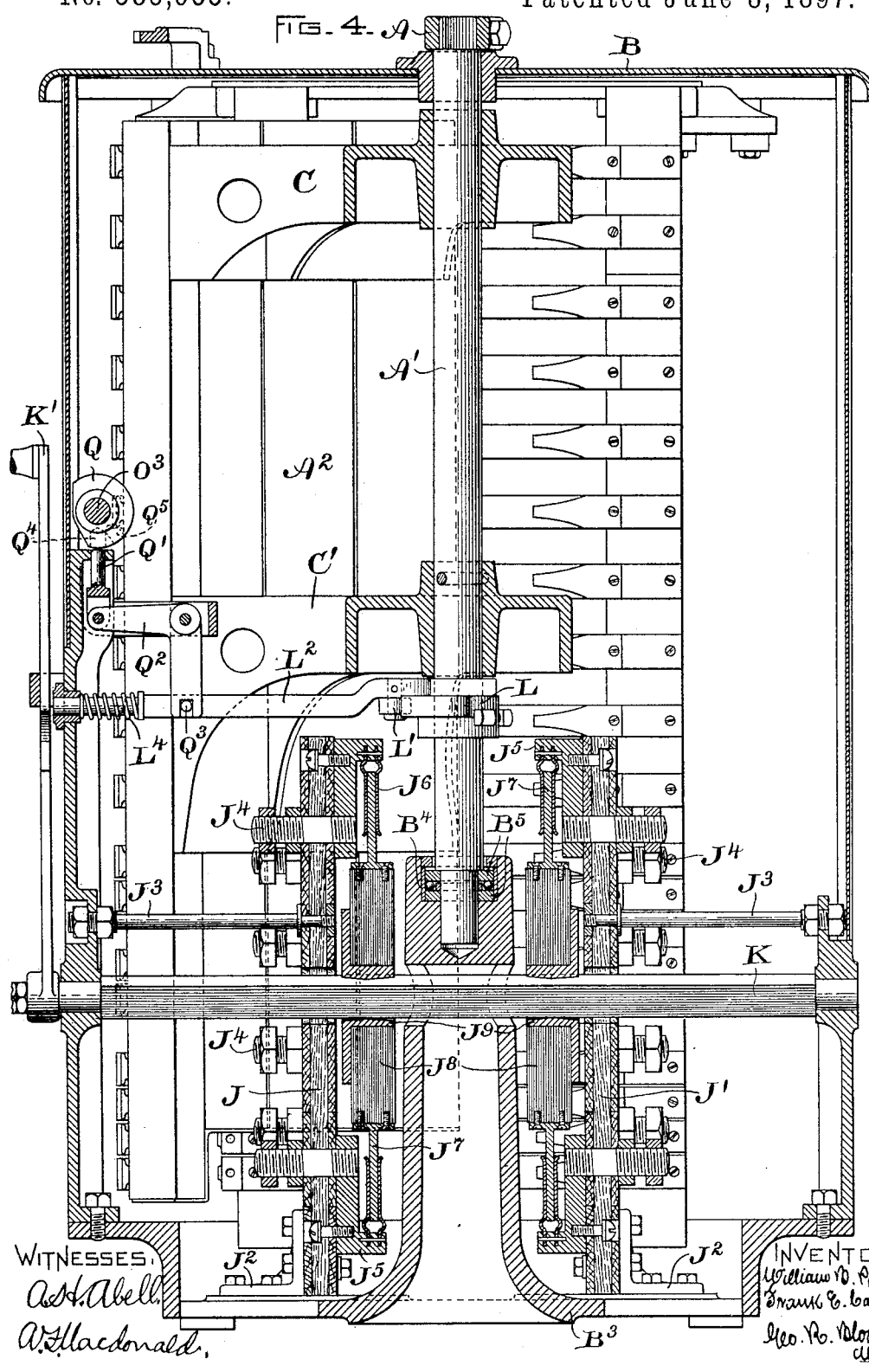

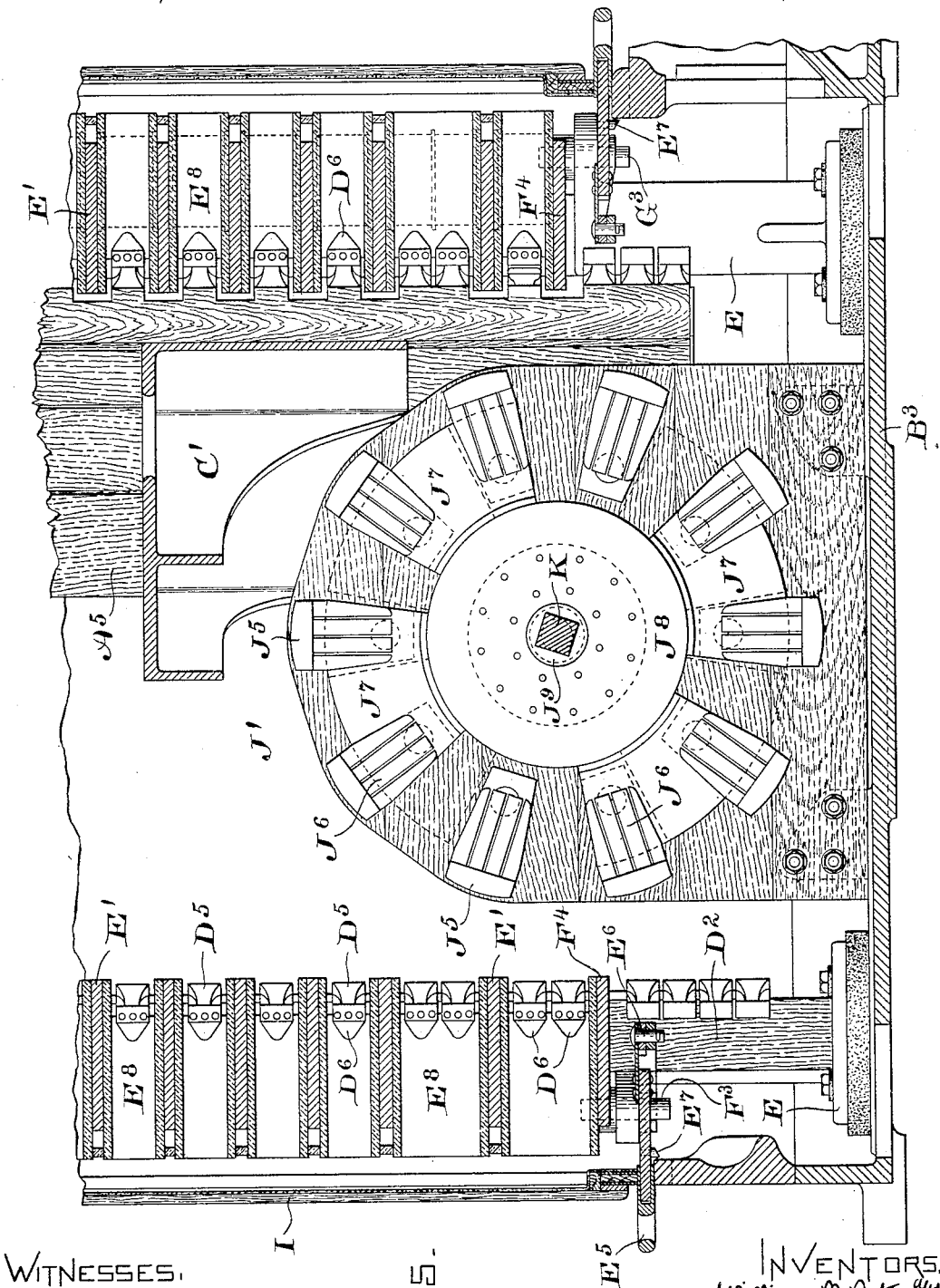

(No Model.) 8 Sheets—Sheet 6.
W. B. POTTER & F. E. CASE.
SERIES PARALLEL CONTROLLER.
No. 583,935. Patented June 8, 1897.
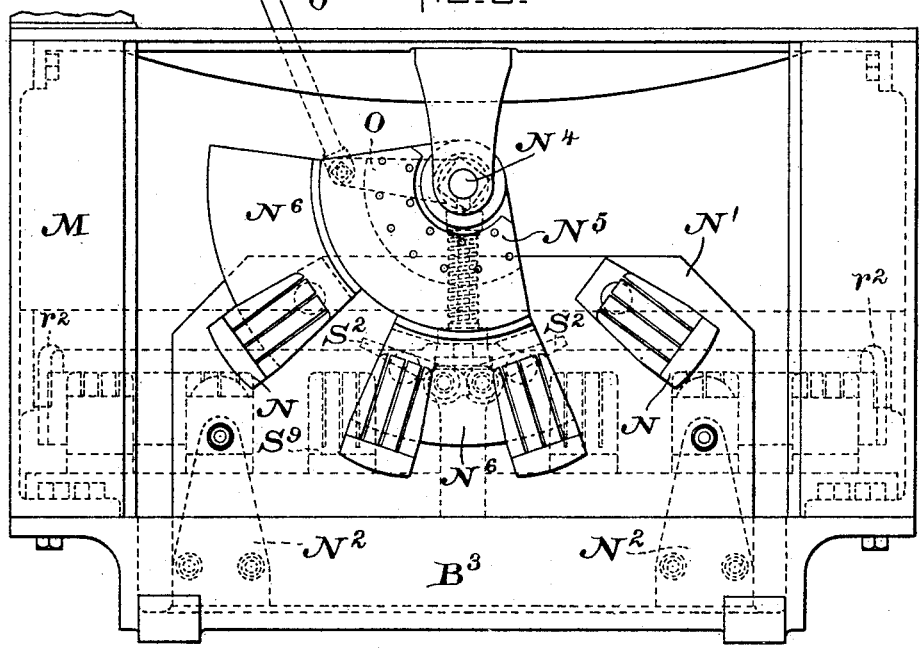
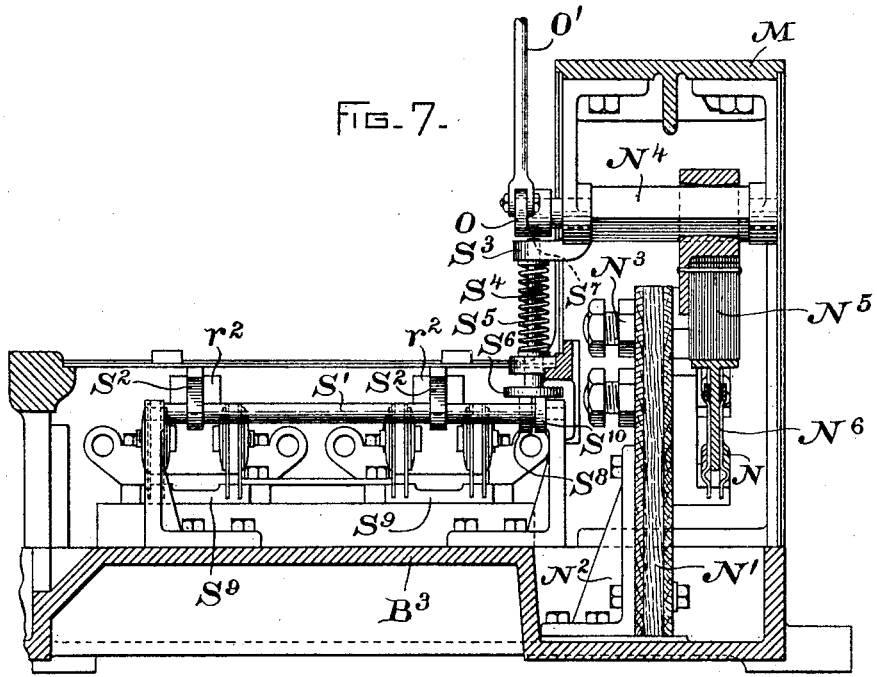
WITNESSES:
A. H. Abell.
A. F. Macdonald.
INVENTORS.
William B. Potter and
Frank E. Case, by
Geo. B. Blodgett,
atty.

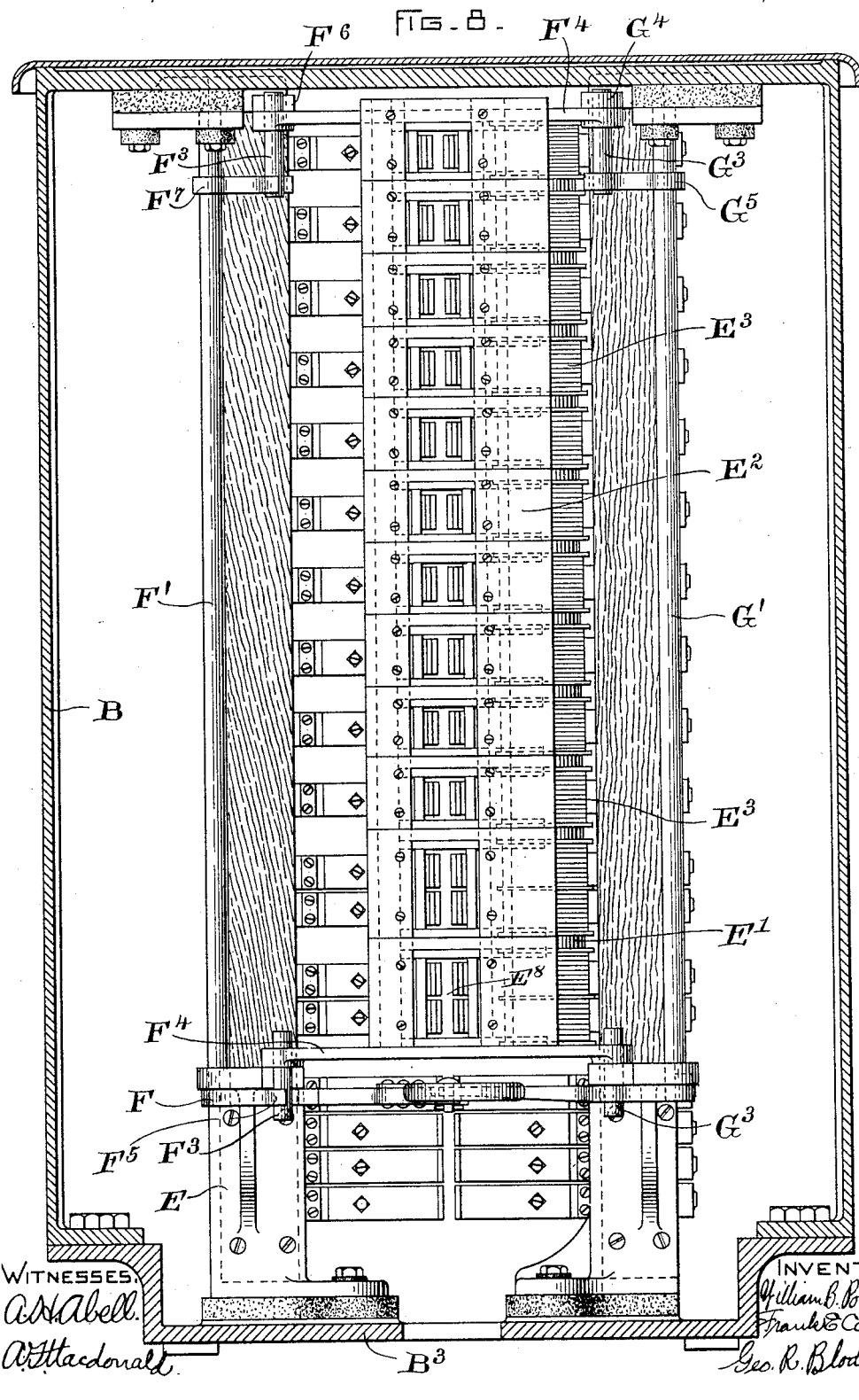

(No Model.) 8 Sheets—Sheet 8.

W. B. POTTER & F. E. CASE.
SERIES PARALLEL CONTROLLER.

No. 583,935. Patented June 8, 1897.

WITNESSES.
A. H. Abell.
A. F. Macdonald.

INVENTORS.
William B. Potter, and
Frank E. Case by
Geo. R. Blodgett
atty.

UNITED STATES PATENT OFFICE.

WILLIAM B. POTTER AND FRANK E. CASE, OF SCHENECTADY, NEW YORK, ASSIGNORS TO THE GENERAL ELECTRIC COMPANY, OF NEW YORK.

SERIES-PARALLEL CONTROLLER.

SPECIFICATION forming part of Letters Patent No. 583,935, dated June 8, 1897.

Application filed October 10, 1896. Serial No. 608,454. (No model.)

*To all whom it may concern:*

Be it known that we, WILLIAM B. POTTER and FRANK E. CASE, citizens of the United States, residing at Schenectady, in the county of Schenectady, State of New York, have invented certain new and useful Improvements in Series-Parallel Controllers, (Case No. 439,) of which the following is a specification.

The present invention has for one of its objects to reduce the vertical height of the resistance-switch cylinder, at the same time maintaining the necessary insulation between the contacts thereon. This feature of the invention is accomplished by providing two sets of stationary brushes or contact devices adapted to engage with the contacts carried by the resistance-switch cylinder. The brushes are located, preferably, at points diametrically opposite and, as the cylinder reciprocates, are adapted to engage therewith and vary the resistance of the motor-circuit.

A further object of the invention consists in arranging the contacts on the resistance-cylinder and the stationary brushes in such relation that the making or breaking of the circuit between them is alternately performed, first on one side of the cylinder and then on the other. This reduces to a minimum the liability of arcing between adjacent contacts or brushes, the time interval between their operation being double that of the ordinary construction, where a single set of brushes is employed.

A further object of the invention is to economize space. This is accomplished by mounting the reversing-switches on the base of the controller inside of the inner periphery of the resistance-switch cylinder in such a a manner that the latter is free to operate. The supports or spiders for the cylinder being located some distance above the lower edge thereof a sufficient amount of vertical space is provided for the switches.

The invention further has for its object to provide a blow-out magnet simple in construction, easy to remove for inspection or repairs, and with its energizing-coils included in separate circuits.

The invention also has for its object to provide cut-out switches in conjunction with a controller capable of establishing more than one relation of the motor-circuits and independently starting and controlling them while so connected.

It further provides means for preventing the actuating of the cut-out switches except when the controlling devices are adjusted for a certain relation of the motor-circuits, and also means for preventing the establishing of a new motor combination after a cut-out switch has been thrown.

A further object of the invention is to provide a certain amount of lateral movement for the reversing and commutating switch-blades, so that they may adjust themselves with relation to the stationary contacts, but at the same time be positively actuated in an angular direction.

The invention also relates to certain details of construction, which are more fully described, and pointed out in the claims.

Figure 7:
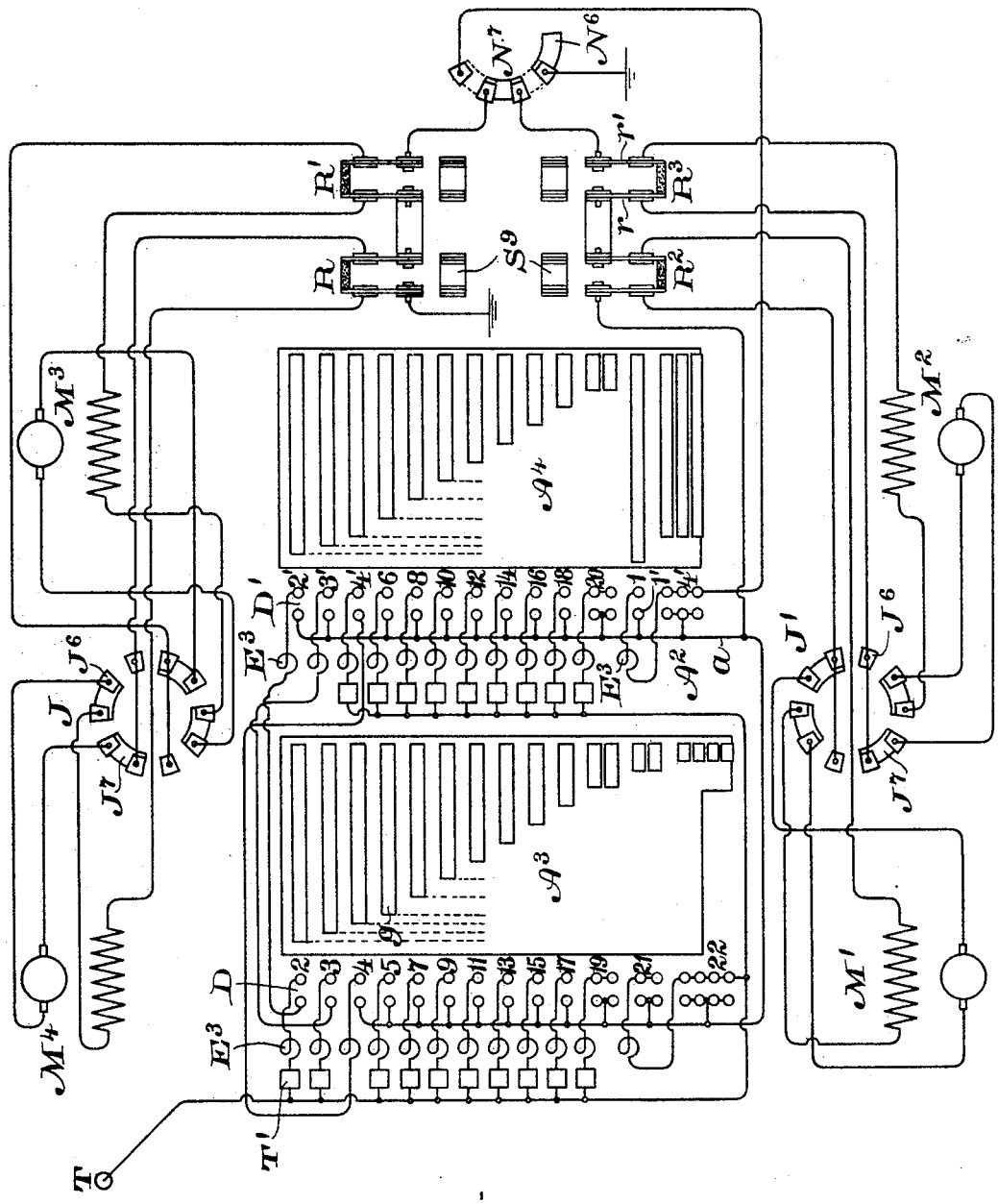

In the accompanying drawings attached to and made a part of this specification, Figure 1 is a plan view of an apparatus embodying our invention. Fig. 2 is a side elevation. Fig. 3 is a horizontal section. Fig. 4 is a transverse section taken on the line 4 4 of Fig. 1; Fig. 5, a section showing the lower part of the controller, taken on the line 5 5 of Fig. 3; Fig. 6, an end view of the commutating-switch; Fig. 7, a sectional view of the commutating and cut-out switches; Fig. 8, an end view of the blow-out magnet with the casing in section, and Fig. 9 a diagram of connections.

In general our controller consists of a resistance-switch comprising two sets of contacts mounted on segments actuated by a common shaft and operating-handle. Located inside of the resistance-switch, but independent thereof, are the reversing-switches, and a system of interlock is provided between the operating-handles of the resistance and reversing switches. Extending outward from one end of the main case inclosing the switches is a smaller case, in which are located the commutating and cut-out switches. A system of interlock is provided between the commutating and resistance switches and also between the commutating and cut-out switches.

A is the operating-lever, secured to the vertical shaft $A'$ of the resistance-switch $A^2$, mounted at the top in a bearing carried by the top of the case B and at the bottom in a bearing formed by an upwardly-extending portion of the base $B^3$, cored out in the center to reduce the weight. As the lower bearing supports the entire weight of the resistance-switch, a ball-thrust bearing $B^4$ is provided consisting of a row of balls between two hardened plates $B^5$, the upper one being seated against a shoulder on the shaft $A'$, the lower one resting on a portion of the projection of the base $B^3$. Mounted on the top of the case B is a segmental rack $B'$, adapted to hold the lever A in any desired position by means of the lock $B^2$.

The resistance-switch $A^2$, Fig. 3, is provided with two sets of contacts $A^3$ and $A^4$. These are situated at diametrically opposite points on segments carried by the shaft $A'$. The segments are made of insulating material—for example, wood—and are divided into strips $A^5$, separated by small spaces $a^7$, which compensate for any expansion of the insulating material. Mounted on the shaft $A'$ are two spiders C and $C'$, provided with polygonal faces on their outer peripheries, to which are secured the insulating-strips $A^5$. Situated on the sides of the switch are rows of vertically-extending contact-brushes D $D'$. These are adapted to vary the resistance of the circuit as the resistance-switch $A^2$ reciprocates. The contacts on the switch and the brushes bear such a relation to each other that the circuit is changed first at D, then at $D'$, in a manner hereinafter described.

Extending vertically are two square pieces of wood $D^2$ and $D^3$, secured at the bottom to brackets E, which are bolted to the base $B^3$ of the inclosing case and secured to the top by suitable means. These pieces form the supports for the cable terminals $D^4$ and their connecting-brushes $D^5$. The brushes may be of any desired construction and are preferably provided with a certain amount of spring to enable them to make good contact with the contacts on the resistance-switch. The ends of the brushes are provided with tips $D^6$, which are somewhat pointed. These are to draw the arc to a place where it can be conveniently disrupted. Surrounding the contact-brushes are rectangular chutes $E^8$, Figs. 3, 5, and 8. These restrict the direction of the arc and at the same time insulate the pole-pieces $E'$ of the blow-out magnet $E^2$ and the brushes $D^5$.

The blow-out magnet $E^2$ comprises a plurality of coils $E^3$. These are mounted on a vertically-extending core $E^4$ and are separated from one another by the pole-pieces $E'$ and suitable insulation. The core $E^4$ is secured at the top and bottom to enlarged pole-pieces $F^4$, Figs. 3 and 8, the remainder being smaller, as indicated by the dotted line H.

The blow-out magnets and arc-deflectors are adapted to be swung outwardly, for the purpose of inspecting the brushes or contacts on the resistance-cylinder, by means of the handle $E^5$. The brackets E, which support the rectangular pieces of wood $D^2 D^3$, are provided with projections, forming lower bearings for the vertically-extending shafts $F'$ and $G'$. The latter are provided at the top with bearings secured to the top of the casing. Mounted in the projecting ends of the pole-pieces $F^4$ are pins $F^3$ and $G^3$, the former being adapted to engage with the arms F when it is desired to lock the blow-out-magnet structure in position and the latter to operate as pivots when it is swung outwardly.

It is evident that the improvements in blow-out magnets which we have invented and described could be readily applied to forms of switches other than the one which we have described in this case, and we aim to include such an application of our invention in the scope of our claims.

The handle $E^5$ is secured to the arm F by suitable rivets. Mounted in the arm F is a pin $E^6$, and engaging therewith is a forked arm G, (shown in dotted lines, Fig. 3,) keyed to the vertically-extending shaft $G'$. Mounted on the upper portion of the shaft $F'$, Fig. 8, is an arm $F^7$, engaging with the pin $F^3$ and adapted, when in the position shown, to prevent the blow-out magnet from moving outward. Situated between the pole-piece $F^4$ and the top of the casing B is a fork $F^6$, Figs. 1 and 8, in which the pin $F^3$ travels and by which it is guided. A similar construction is shown on the opposite side, except that $G^4$ is made in the form of a loop and forms a center about which the magnet is swung. I is a vertically-extending cover adapted to protect the inclosed apparatus and is secured in any desired manner.

When it is desired to inspect the blow-out magnet and arc-restraining chutes, the cover I is removed, the handle $E^5$ lifted slightly, releasing the lug $E^7$, Fig. 5, from engagement with the outer frame, and a movement to the left of the handle will cause the pin $E^6$, mounted in the arm F, to move toward the front, and at the same time the arm G will also be moved. The slot $G^6$, into which the pin $G^3$ projects, is arranged to compensate for this angular movement. The lug $F^5$ of the arm F, moving around the shaft $F'$ as a center, will, after a certain movement, release the pin $F^3$, mounted on the pole-piece $F^4$. The pin $G^3$, being in the left-hand end of the slot $G^2$ and held from lateral movement by the arm G, will act as a center, and the magnetic structure can be swung outward by hand. The arms $F^7$ and $G^5$, being keyed to the shafts $F'$ and $G^2$, respectively, operate to move the top of the magnet structure in a manner corresponding to the arms at the bottom.

It will be seen from the above that the magnet structure as a unit is moved forward away from the brushes for a certain distance in a straight line before it is moved around pins $G^3$ as a center. This enables the chutes $E^8$ to clear the ends $D^6$ of the brushes.

The reversing-switches J $J'$, Figs. 3, 4, and 5, are mounted on wooden bases or backs, in which the layers of wood are at right angles to each other, for the purpose of reducing the warping to a minimum. The switches are vertically disposed in the controller-casing and are provided with feet $J^2$, bolted to the base $B^3$. The upper portions are secured by means of rods $J^3$. On the outer surfaces of the bases are mounted the binding-posts $J^4$ for the cable-terminal. This permits the ready inspection of the parts and reduces the complication when it is necessary to make changes in the connections. On the inner surfaces of the bases are mounted the stationary contact-blades $J^5$. These are connected to the motors in a manner to be hereinafter described. The stationary contacts are provided with spring-blades $J^6$, engaging with both sides of the movable blades $J^7$, carried by the support $J^8$. The latter is made of fiber or other insulating material, and secured to its outer periphery by screws are the blades $J^7$. The center or hub $J^9$ is made of metal and provided with a square opening, through which the operating-shaft K extends. The switches are actuated by the shaft K, supported at its outer extremities by suitable bearings in the vertical sides of the casing B and prevented from lateral movement by suitable shoulders formed thereon. To permit the switches to adjust themselves in case the shaft K gets out of line or the switch-bases out of parallel, a limited universal movement is provided for each support $J^8$. The square opening in the hub $J^9$ tapers from the center to the outside, as shown in Figs. 4 and 7. This acts as a universal joint, permitting a certain amount of lateral movement independent of the shaft, but positively actuating the switch in its angular movement. The switches J and J' are so located on the base with respect to each other and the resistance-switch that the latter surrounds the former and is free to reciprocate as the handle A is actuated.

To guard against the simultaneous operation of the resistance and reversing switches, an interlock is provided. Mounted on the vertical shaft A', Figs. 3 and 4, is a cam L, and engaging therewith is a cam-roller L', mounted in the end of the arm $L^2$. The latter has on its outer end a circular portion adapted to pass through a bushing in the casing and engage with the hole $L^3$, Fig. 2, in the operating-lever K' of the reversing-switch when the latter is in the center or "off" position. This locks the reversing-switch in such a position that the movable blades $J^7$ are as shown by dotted lines in Fig. 5, and the circuit is interrupted at a number of points, which guards against the accidental starting of the train in the event of the motorman leaving his position.

On the operating-lever K' is a projection $K^2$, extending both sides of the center, preventing the reversing-switch from being operated when the resistance-switch is in other than its "off" position. The throw of the arm $L^2$ is sufficient to cause the end to project through the lever K' for locking it. The spring $L^4$ is utilized to return it to the position shown.

Mounted in an inclosing casing M, forming an extension of the main case B, are the commutating and cut-out switches. (Illustrated more particularly in Figs. 1, 3, 6, and 7.)

The stationary contacts N, Figs. 6 and 7, are mounted on a base or support N', secured to the base $B^3$ by means of brackets $N^2$. On the back of the base are the binding-posts $N^3$, which are connected to the motor-circuits in a manner to be hereinafter described. The bearings for the operating-shaft $N^4$ are supported by the top of the casing M. Mounted on the shaft $N^4$ is a segment $N^5$, of insulating material, to which are secured the contacts $N^6$ in any suitable manner. The hub of the segment $N^5$ is provided with a square hole of the same construction as that of the reversing-switches, and the switch centers itself in the same manner.

Secured to the shaft $N^4$ is a lever O, Figs. 1 and 2, and connected therewith is a rod O', extending upward to the lever $O^2$, carried by the shaft $O^3$, which is mounted in suitable bearings and extending laterally across the front of the controller just inside of the casing, as shown in Figs. 2 and 3. Mounted on the right-hand corner of the casing B in a suitable bearing is a segmental bevel-gear P, meshing with a similar one P', keyed to the shaft $O^3$. The gear P is formed with a projection, to which is secured the operating-lever $P^2$.

Keyed to the shaft $O^3$ directly over the lever $L^2$ is a cam Q, Fig. 4, provided with an opening (shown in dotted lines) into which the pin Q' is adapted to be forced when the bell-crank lever $Q^2$ is operated by means of the pin $Q^3$, carried by the arm $L^2$. The bell-crank lever $Q^2$ is supported by a U-shaped forging bolted to a projection on the frame of the casing B.

When it is desired to operate the commutating-switch for changing the motor connections from series to parallel, or vice versa, the resistance-switch is brought to the "off" position and with the reversing-switch lever K' in its extreme right or left hand position, which will bring the operating parts to the relation shown in the drawings. The lever $P^2$ can be moved forward or back, depending upon the position it previously occupied, and motion will be transmitted through the operating mechanism to the segment $N^5$ of the commutating-switch. In the event of the resistance-switch being in other than its "off" position the pin Q' will have been forced upward into the hole $Q^4$ or $Q^5$ in the cam Q and prevent the rotation of the shaft $O^3$. If the commutating-switch is in other than its series or parallel position, the pin Q' will engage with the outer surface of the cam Q and movement of the resistance-switch will be prevented.

To provide for cutting a disabled motor or motors out of circuit and limiting the operation of the resistance-switch, separate cut-out switches are provided for each motor, so arranged that they actuate a common limiting device when thrown from their normal position. The cut-out switches, of which there are four, are best shown in Figs. 1, 6, and 7. R cuts out motor $M^4$, R' motor $M^3$, $R^2$ motor M', and $R^3$ motor $M^2$. The switches are provided with two blades $r$ and $r'$, pivoted to vertical contact-pieces $r^3$, suitably insulated from the base $B^3$. The blades are connected together by the insulating-piece $r^2$, which serves as an operating-handle for throwing the blades into engagement with the piece $S^9$, which connects the blades together when a motor is cut out of circuit.

Midway between switches R R' and $R^2$ $R^3$ are two parallel shafts S S'. These are mounted in suitable bearings, and keyed thereto are arms $S^2$, engaging with the switches when they are thrown to cut out a motor. Projecting from the left-hand bearing of the shaft $N^4$, Fig. 7, is a lug $S^3$, which forms a bearing for the spring-pressed plunger $S^4$. The latter is provided with a suitable bearing at the bottom, and a spring $S^5$ holds the disk $S^6$ of the plunger in the position shown. In the hub of the lever O is a hole $S^7$, (shown in dotted lines,) into which the plunger $S^4$ is forced when a cut-out switch is thrown. Assuming, for example, that the motors are running in multiple and trouble occurs with the motor $M^4$, the resistance-switch is brought to the "off" position, the one shown in the drawings, and the commutating-switch thrown to the series position. The switch R is then thrown so that the blades engage with the short-circuiting piece $S^9$, and the handle $r^2$, engaging with the lever $S^2$ in its downward movement, depresses the latter, which rotates the shaft S, causing the cam $S^8$ to engage with the under surface of the disk $S^6$ and raise it. The end of the plunger $S^4$ is then inserted in the hole $S^7$ of the lever O, locking the latter against further movement. In cutting motor $M^2$ out the switch $R^3$ would be thrown and the action of the interlock would be the same as with motor M'. When switch $R^2$ or $R^3$ is thrown, the interlock is operated through the medium of the shaft S' and the cam $S^{10}$.

The operation of the controller with respect to the cut-out switches in the present invention differs from that of others with which we are familiar, in that while two separate and distinct relations of the motor connections may be established and the motors started and stopped in the usual manner while so connected, the cut-out switches can only be operated when the motors are in the series relation. This prevents the unbalancing of the system which would result if one motor of a pair was cut out, leaving its mate to be subjected to twice the normal potential.

In this application we claim, broadly, a controller having a plurality of separate means for controlling the motors with cut-out switches, which can be operated only when one of the said means is employed and, after the switch or switches are thrown, cutting out a motor or motors, preventing the establishing of new relations of the motor-circuits.

Referring to Fig. 9, $A^3$ and $A^4$ represent the two segments of the rheostatic switch $A^2$. These are provided with horizontal rows of contacts adapted to bridge the brushes in the rows D and D' when the switch is reciprocated.

In circuit with each pair of brushes is an energizing-coil of the blow-out magnet, which creates a strong field largely local at the point where the circuit is interrupted and one proportional to the amount of current flowing in that particular circuit. This construction presents advantages over a single energizing-coil for the magnet structure in that there is no waste of current consumed in energizing a large number of contacts, but a field is created at the point where it is most needed.

The contacts and brushes have been shown as developed on the same plane in Fig. 9, and a movement to the left of the contact-segments $A^3$ $A^4$ with respect to the brushes D and D' will coincide with the movement indicated by the arrow in Fig. 1.

Assuming that the switch $A^2$ has been moved so that the contacts engage with the rows of stationary brushes, current will enter at the trolley T, pass through the resistance T', through the coil $E^3$ of the blow-out magnet to the brush 2, thence to its adjacent brush by means of the contact on $A^3$, which spans them, to brush 2' of row D' to its adjacent brush, thence by bus-wire $a$ to the cut-out switch $R^2$, reversing-switch J', armature of M', reversing-switch J', field of M', reversing-switch J', cut-out switch $R^2$, cut-out switch $R^3$, reversing-switch J', armature of $M^2$, reversing-switch J', field of $M^2$, cut-out switch $R^3$, commutating-switch $N^7$, cut-out switch R', reversing-switch J, armature of $M^3$, reversing-switch J, field of $M^3$, cut-out switch R', cut-out switch R, reversing-switch J, armature of $M^4$, reversing-switch J, field of $M^4$, cut-out switch R, to ground. This connects the four motors in series with suitable resistance. A further movement of the switch $A^2$ to the left will close the circuit through brushes 3 and 3', then 4 and 4', which reduces the resistance of the circuit a predetermined amount. So far the circuit has been completed simultaneously on both sets of contacts, but the contact opposite brush 5 on $A^3$ is slightly in advance of the contact on $A^4$, which is opposite the brush 6, as indicated by the dotted lines, so that the circuit is completed at 5, then 6. It will be noted that from brush 5 in row D to brush 20 in row D' the circuit is alternately completed or interrupted when returning, first on one side, then the other, of the switch A², each step cutting out more and more resistance. This alternation permits the gases formed at the interrupting of a circuit to dissipate before the adjacent circuit is interrupted, and as the contacts are arranged the time interval is double that which it would be if a single set of brushes and contacts were employed. With the commutating-switch set as shown the motors are connected in series and the resistance can be cut out of or into circuit at will, forming a simple rheostatic controller for the motors.

When it is desired to run the motors at a higher speed, the contacts N⁶ of the commutating-switch are moved to the position shown in dotted lines, which connects the motors in series-parallel relation. The circuit enters by way of trolley T, resistance T', blow-out coil E³, brush 2, thence to its adjacent brush by means of the contact on A³ to blow-out coil E³, to brush 2' and its adjacent brush by means of the upper contact on A⁴, bus a, brushes 1' and 1, blow-out coil E³, multiple brushes 4', commutating-switch N⁷, cut-out switch R', reversing-switch J, armature of M³, reversing-switch J, field of M³, cut-out switch R', cut-out switch R, reversing-switch J, armature of M⁴, reversing-switch J, field of M⁴, cut-out switch R, to ground. Starting back at brush 2' and bus a, a second circuit is through cut-out switch R², reversing-switch J', armature of M', reversing-switch J', field of M', cut-out switch R², cut-out switch R³, reversing-switch J', armature of M², reversing-switch J', field of M², cut-out switch R³, to commutating-switch N⁷, to ground. This completes the circuit of the series-parallel combination, and a further movement of the resistance-switch A² to the left cuts out resistance until the motors are connected directly between the trolley T and ground. In connection with the brushes 4', 19, 20, 21, and 22 it will be noted that a number of them are connected in multiple. This is to insure good contact between the stationary and moving parts and to carry the heavy current.

In case trouble occurs with motor M⁴ the commutating-switch N⁷ is brought to the series position. This brings the hole S⁷ (shown in dotted lines in the lever O, Fig. 7) opposite the plunger S⁴, and the cut-out switch R can be thrown, cutting out motor M⁴ and locking the switch N⁷ in the series position. The series circuit is now completed through the short-circuiting piece S⁹. The other cut-out switches operating in the same manner further description is unnecessary.

What we claim as new, and desire to secure by Letters Patent of the United States, is—

1. In a controller, the combination of a cylindrical switch, contacts thereon, and sets of stationary brushes engaging therewith, the brushes and contacts bearing such a relation to each other that the circuit is alternately completed or broken at one set, then at another.

2. In a controller, the combination of sets of contacts mounted for rotary movement, sets of stationary brushes engaging therewith, one set of the moving contacts being slightly longer or in advance of any other, whereby the interrupting or completing of the circuits is alternately accomplished first at one set of contacts, then at another.

3. In a controller, the combination of sets of contacts mounted for rotary movement, means for imparting motion to the sets of contacts at the same rates of speed, and a plurality of rows of stationary brushes, the brushes of one row engaging with its set of moving contacts slightly in advance of another row.

4. In a controller, the combination of two rows of stationary contacts, segments suitably mounted for rotary movement, contacts mounted on the segments adapted to bridge the brushes in the rows of stationary contacts, certain of the brushes and contacts on opposite segments operating simultaneously at the closing of the circuit, the remainder operating in alternation.

5. In a controller, the combination of a switch mounted for rotary movement, a support or spider for the switch provided with polygonal faces, strips of insulating material secured to the faces, and contacts mounted on the insulating-strips.

6. In an electric controller, the combination of a switch having stationary and moving contacts, a second switch having a cylindrical portion inclosing the first switch and mounted for rotary movement, the two switches being independent of each other.

7. In a controller, the combination of a switch having stationary and moving contacts, a vertically-extending support for the switch, a second switch having a cylindrical portion inclosing the first switch and mounted for rotary movement, and means for operating the switches independently.

8. In a controller, the combination of a switch mounted for rotary movement, a cylindrical portion forming a part of the switch, a spider or support for the cylindrical portion, a reversing-switch extending inside of the cylindrical portion, but independent thereof, means for operating the switches independently, and means for preventing their simultaneous operation.

9. A blow-out magnet provided with a plurality of energizing-coils, each included in a separate circuit.

10. In a controller, the combination of a plurality of stationary contact-brushes, moving contacts engaging therewith, and a plurality of blow-out-magnet coils, each included in a separate circuit.

11. In a controller, the combination of a plurality of energizing-coils mounted on the core of a blow-out magnet, pole-pieces at the ends of the core forming top and bottom supports, and pins secured to the pole-pieces, those on one side forming a pivot about which the blow-out magnet can be moved.

12. In a controller, the combination of a plurality of arc-restraining chutes, pole-pieces between the chutes, energizing-coils included in separate circuits, operating-shafts extending parallel with the core of the magnet, and arms connected to the shafts for imparting similar movements to top and bottom of the magnet structure when it is moved away from its normal position.

13. In a controller, a plurality of arc-restraining chutes, a magnet for disrupting the arcs formed between contacts, an energizing-coil for the magnet, a pole-piece secured to the core of the magnet, and means for moving the magnet and arc-restraining chutes as a unit when it is desired to inspect the operating parts of the controller.

14. In a controller, the combination of a blow-out magnet, a handle secured to an operating-lever, a pin carried by the lever, a forked lever engaging with the pin, vertically-extending shafts to which the levers are secured, and levers mounted at the top of the shafts engaging with the magnet structure for moving the upper portion when the handle is pulled outward.

15. In a controller, the combination of a blow-out-magnet structure, means for moving it outward in a straight line for a certain distance, and means for pivoting the structure on one side, so that it may be swung in the arc of a circle.

16. In a controller, the combination of a plurality of separate means for controlling the motors, cut-out switches for the motors, means preventing the operation of the cut-out switches except when the motors bear a certain relation to each other, and means preventing the establishing of a new relation of the motor-circuit after a cut-out switch has been thrown.

17. In a controller, the combination of a commutating-switch for establishing different relations of the motor-circuits, a rheostatic or controlling switch independent of the commutating-switch, for starting, stopping and controlling the motors when so connected, cut-out switches for the motors, and means preventing the operation of the switches except when the commutating-switch is in a certain position.

18. In a controller, the combination of a commutating-switch for establishing a series or parallel relation of the motor-circuits, a rheostatic or controlling switch independent of the commutating-switch, for starting, stopping and controlling the motors when so connected, cut-out switches for the motors, means for preventing their operation except when the commutating-switch is in the series position, and means for preventing the commutating-switch from establishing a new relation of the motor-circuits after a cut-out switch has been thrown.

19. In a switch, the combination of fixed contacts, a plurality of moving contacts engaging therewith, an insulating-support to which the moving contacts are secured, an actuating-shaft, and means permitting the insulating-support to rock on the actuating-shaft.

20. In a switch, the combination of fixed contacts, a plurality of moving contacts engaging therewith, an insulating-support to which the moving contacts are secured, and a metal hub for the support so arranged that a limited lateral movement of the insulating-support is permitted independent of the shaft, but which is positively actuated in an angular direction.

21. In a controller, the combination of parallel switches, stationary contacts therefor, an operating-shaft, movable contacts, supports for the contacts mounted on the shaft, and means for providing a certain amount of lateral movement to each support independent of the other or others.

22. In an electric controller, the combination of contacts mounted for rotary movement in a horizontal plane, and contacts mounted for rotary movement in a vertical plane, one set of contacts being mounted inside of the other, and means for actuating both sets of contacts independently.

In witness whereof we have hereunto set our hands this 9th day of October, 1896.

WILLIAM B. POTTER.
FRANK E. CASE.

Witnesses:
B. B. HULL,
A. F. MACDONALD.